Patented Mar. 19, 1929.

1,705,862

UNITED STATES PATENT OFFICE.

ALBERT HARTZELL, OF YONKERS, AND FRANK H. LATHROP, OF GENEVA, NEW YORK, ASSIGNORS TO WALTER C. O'KANE, OF DURHAM, NEW HAMPSHIRE, AND PAUL MOORE, OF WASHINGTON, DISTRICT OF COLUMBIA, TRUSTEES OF THE CROP PROTECTION INSTITUTE, AN ASSOCIATION IN WASHINGTON, DISTRICT OF COLUMBIA.

COLLOIDAL SULPHUR AND METHOD OF MAKING SAME.

No Drawing.   Application filed June 10, 1924.   Serial No. 719,108.

This invention relates to colloidal sulphur and to methods for preparing such sulphur.

Among the objects and advantages of this invention is the simple and inexpensive production of colloidal sulphur particularly adapted for insecticidal and fungicidal use.

Other objects and advantages will appear from the more detailed disclosure set forth below, it being understood that this disclosure is given by way of example, and not by way of limitation, since various changes may be made herein, by those skilled in the art, without departing from the spirit and scope of this invention.

Basically, this invention sets forth the distribution of sulphur within a body of a substance which is solid, preferably, at ordinary temperatures, and the preparation of a finely divided sulphur from this resulting sulphur solution or mixture. The last named step may take several forms, as precipitation by substances preferably in liquid form, or by fine grinding. In all cases a finely divided sulphur is obtained.

As one example of carrying out this invention, sulphur and naphthalene in equal proportions were melted together. The solution thus obtained was solidified, preferably, by packing ice around it. This prevents the napthalene from separating from the sulphur. The solid solution thus obtained was broken up as by means of a hammer, and the smaller pieces thus obtained subjected to grinding; as in a ball mill, to produce a fine sulphur-napthalene dust. A dust made in this way has given good results with, for example, aphids of Myzus persicae.

In place of napthalene, any other distributing agent may be used, and particularly those which form solid solutions with the sulphur, such as a wax, and more particularly, paraffin wax. The proportions of sulphur to distributing agent may vary widely. For example from one part of naphthalene to 25 parts of sulphur, to 25 parts of naphthalene to one part of sulphur. It has been found however that solid solutions of equal parts of naphthalene and sulphur, seemed to grind the best. Instead of melting the components together, the naphthalene or other distributing agent may be melted and the sulphur, preferably as flowers of sulphur, added. The solution is then heated until all of the sulphur melts or dissolves.

Instead of grinding the napthalene sulphur solution to a dust, the molten mass may be treated with a solution to emulsify it. As an example of this method of carrying out the process, the following is given: A sulphur-naphthalene solution made as described above (or by melting 50 parts of flake naphthalene to which 20 parts of flowers of sulphur is then added slowly until dissolved) is slowly treated with a hot soap solution made up of 5 parts of fish-oil soap in 100 parts of water, and agitated a short time. A creamy white paste is formed. This paste may be diluted by adding 500 parts of water to 10 parts of the paste and agitating, a milky white colloidal sulphur solution being formed. The particles of sulphur in this solution range in size from .5 micron down, and contain some naphthalene crystals.

The solution used for emulsifying the sulphur may be any soap, preferably a sodium or potassium soap, although fish-oil soap having inherent insecticidal properties, is to be preferred. In place of soap solutions, other emulsifying agents may be used, such as glycerine, glue, or gums. While a hot solution at a temperature of 100° C. is preferred, the emulsifying solution may be either hot or cold. The concentration of solution may vary within wide limits, for example with soap and water, 1-100 parts of soap in 1000 parts of water may be used. While the sulpher-napthalene may be added to the soap solution, it is better to add the soap solution to the sulphur-napthalene.

These various colloidal and finely divided sulphurs are particularly useful as insecticides and fungicides.

Having thus set forth the invention, we claim:

1. A sulphur emulsion produced from sulphur dissolved in naphthalene as a distributing agent and emulsified in an emulsifying medium containing soap.

2. A sulphur emulsion produced from sulphur dissolved in a normally solid distributing agent and emulsified in an emulsifying medium containing an emulsifying agent.

3. A sulphur emulsion produced from sulphur dissolved in naphthalene as a distributing agent and emulsified in an emulsifying medium containing fish oil soap.

4. A paste containing emulsified sulphur produced from sulphur dissolved in naphthalene as a distributing agent and emulsified in an aqueous emulsifying medium containing fish oil soap.

5. The process of making emulsified sulphur which comprises forming a solid solution of sulphur in a distributing agent, and then emulsifying the solid solution in a dispersion medium.

6. The process of making emulsified sulphur which comprises forming a solid solution of sulphur in a distributing agent, and then suspending the solid solution in a solution of a soap.

7. The process of making emulsified sulphur which comprises melting sulphur and naphthalene together, and then adding a hot solution of fish oil soap in water to the melt.

8. A milky white emulsified sulphur solution containing crystals of naphthalene, the particles of sulphur ranging in size from .5 microns down.

ALBERT HARTZELL.
FRANK H. LATHROP.